US008898320B2

(12) United States Patent
Mai et al.

(10) Patent No.: US 8,898,320 B2
(45) Date of Patent: Nov. 25, 2014

(54) VIRTUAL MULTICASTING

(76) Inventors: Khanh Mai, Alpharetta, GA (US);
Roland Noll, Columbia, MD (US); Tom Grimes, Ottawa (CA); Tom Dong, Marietta, GA (US)

(*) Notice: Subject to any disclaimer, the term of this patent is extended or adjusted under 35 U.S.C. 154(b) by 2317 days.

(21) Appl. No.: 11/454,910

(22) Filed: Jun. 19, 2006

(65) Prior Publication Data
US 2006/0242311 A1 Oct. 26, 2006

Related U.S. Application Data

(63) Continuation of application No. 09/893,634, filed on Jun. 29, 2001, now abandoned.

(60) Provisional application No. 60/214,752, filed on Jun. 29, 2000.

(51) Int. Cl.
*G06F 15/16* (2006.01)
*H04L 12/701* (2013.01)
*H04L 12/18* (2006.01)
*H04L 12/761* (2013.01)

(52) U.S. Cl.
CPC ............ *H04L 45/00* (2013.01); *H04L 12/1836* (2013.01); *H04L 45/16* (2013.01); *H04L 12/185* (2013.01)
USPC ............ 709/229; 370/401; 370/390; 709/249

(58) Field of Classification Search
USPC ............................ 709/229, 238; 370/390, 260
See application file for complete search history.

(56) References Cited

U.S. PATENT DOCUMENTS

| 5,959,989 | A | * | 9/1999 | Gleeson et al. | 370/390 |
| 6,049,878 | A | * | 4/2000 | Caronni et al. | 726/3 |
| 6,138,144 | A | * | 10/2000 | DeSimone et al. | 709/204 |
| 6,181,697 | B1 | * | 1/2001 | Nurenberg et al. | 370/390 |
| 6,259,701 | B1 | * | 7/2001 | Shur et al. | 370/401 |
| 6,389,453 | B1 | * | 5/2002 | Willis | 709/204 |
| 6,611,872 | B1 | * | 8/2003 | McCanne | 709/238 |
| 6,791,981 | B1 | * | 9/2004 | Novaes | 370/390 |
| 7,031,326 | B1 | * | 4/2006 | Shur et al. | 370/401 |
| 7,079,495 | B1 | * | 7/2006 | Pearce et al. | 370/260 |
| 7,266,686 | B1 | * | 9/2007 | Monteiro et al. | 713/161 |
| 7,710,961 | B2 | * | 5/2010 | Miller et al. | 370/390 |
| 7,908,337 | B2 | * | 3/2011 | Garcia-Luna-Aceves et al. | 709/217 |
| 2005/0259682 | A1 | * | 11/2005 | Yosef et al. | 370/468 |

* cited by examiner

*Primary Examiner* — Greg C Bengzon
(74) *Attorney, Agent, or Firm* — Andrews Kurth, LLP; Aldo Noto; Sean Wooden

(57) ABSTRACT

A method and system of virtual multicasting content is disclosed. The method and system disclosed enable the receipt of virtual multicast content without requiring the expensive investment in the infrastructure necessary for a network to be multicast enabled. The virtual multicasting may be performed according to a method of virtual multicasting multicast content on non-multicast enabled networks, comprising the steps of determining if an attached network is multicast enabled, if the attached network is not totally multicast enabled, querying for virtual multicast requests for the multicast content from non-multicast enabled client computers, listening for virtual multicast requests, and determining, based on the virtual multicast requests, which client computers request the multicast content, from the unicast addresses, and the requested methods of delivery for the multicast content. The network includes client computers that have unicast addresses and the at least one virtual multicast request includes a unicast address identifying a client computer of the network and a requested method of delivery for the multicast content.

39 Claims, 12 Drawing Sheets

VIRTUAL MULTICASTING

CROSS REFERENCE TO RELATED APPLICATIONS

This is a Continuation of application Ser. No. 09/893,634 filed on Jun. 29, 2001 now abandoned which is hereby incorporated by reference in its entirety.

This application hereby claims the benefit of the priority of U.S. Provisional Patent Application Ser. No. 60/214,752, filed Jun. 29, 2000, which is hereby incorporated by reference. This application also hereby incorporates by reference U.S. patent application Ser. No. 09/835,529, entitled "Channel Dancer" and filed Apr. 17, 2001, U.S. patent application Ser. No. 09/878,232, entitled "Personal Content Manager" and filed Jun. 12, 2001, and U.S. patent application entitled "Digital Rights Management", invented by Khanh Mai, Roland Noll, and Tom Grimes and filed on the same date, under separate cover, as the present application.

BACKGROUND

1. Technical Field

The present invention is related to Internet Protocol ("IP") multicasting, and more particularly to IP multicasting over a non-IP multicast supported network.

2. Description of Related Art

Over the past ten years, the bandwidth capacity available to consumers for receiving content from the Internet and other networks has increased ten-fold and more. The increased bandwidth capacity has enabled consumers to download larger and larger files and other content, including rich media and multimedia content such as audio clips, video clips, songs, programs, and movies. This increased bandwidth capacity has increased Internet usage and the potential for enjoyable and productive usage.

The content may be delivered to users, for example, as real-time IP multicast or unicast streams. IP multicasting is a method to send a single message to multiple recipients belonging to a multicast group. To multicast content, a multicast group is created by a multicast router and Internet Group Management Protocol (IGMP) queries for the multicast content are sent out to clients via the router's network. Clients that want to receive the multicast content send a IGMP report, in response to the IGMP query to the multicast router and are added to the multicast group. Any client that is a member of the multicast group receives the multicast content. The IP multicasting method can reduce the unnecessary network load caused by the unicasting method, which sends out multiple copies of the same message to multiple recipients. Despite the increased bandwidth capacity, however, most networks, especially Internet Service Provider ("ISP") networks, are not IP multicast enabled. Enabling IP multicasting in a network requires equipment upgrades. Also, broadcasting of heavily requested content may be bandwidth prohibitive for many networks. Unfortunately, the necessary equipment upgrades are often not undertaken by many networks. Many networks do not make the necessary equipment upgrades because the equipment upgrades are not cost efficient.

What is needed is a mechanism for delivering IP multicast content to users via a non-multicast enabled network.

SUMMARY OF THE INVENTION

An advantage of the present invention is that it overcomes the disadvantages and shortcomings of the prior art. Another advantage of the present invention is that it provides a method and a system for simulating multicasting over non-multicast enabled networks. Another advantage of the present invention is that it provides a system that is able to distribute multicast/unicast packets to multiple end-users through non-multicast enabled networks with multicast efficiency. Another advantage of the present invention is that it does not require changes on the pre-existing infrastructure of the networks. The potential beneficiaries of the present invention include applications involving fan-out distribution of packets, content distribution to multiple isolated (non-multicast enabled in between) networks, and last stop distribution of packets (see FIGS. 1, 7, and 8).

These and other advantages of the present invention are achieved by a method of virtual multicasting multicast content on non-multicast enabled networks, comprising the steps of determining if an attached network is multicast enabled, if the attached network is not totally multicast enabled, querying for virtual multicast requests for the multicast content from non-multicast enabled client computers, listening for virtual multicast requests, and determining, based on the virtual multicast requests, which client computers request the multicast content, from the unicast addresses, and the requested methods of delivery for the multicast content. The network includes client computers that have unicast addresses and the at least one virtual multicast request includes a unicast address identifying a client computer of the network and a requested method of delivery for the multicast content.

These and other advantages of the present invention are also achieved by a computer-readable medium comprising instructions for virtual multicasting (VMC) multicast content on non-multicast enabled networks, by determining if an attached network is multicast enabled, if the attached network is not totally multicast enabled, querying for virtual multicast requests for the multicast content from non-multicast enabled client computers, listening for virtual multicast requests, and determining, based on the virtual multicast requests, which client computers request the multicast content, from the unicast addresses, and the requested methods of delivery for the multicast content. The network includes client computers that have unicast addresses and the at least one virtual multicast request includes a unicast address identifying a client computer of the network and a requested method of delivery for the multicast content.

These and other advantages of the present invention are also achieved by a system for virtual multicasting (VMC) multicast content on non-multicast enabled networks, comprising a virtual router and an attached network, associated with the virtual router, that includes a plurality of client computers that have unicast addresses. The virtual router includes software comprising instructions for determining if the attached network is multicast enabled, if the attached network is not totally multicast enabled, querying for virtual multicast requests for the multicast content from non-multicast enabled client computers, listening for virtual multicast requests, and determining, based on the virtual multicast requests, which client computers request the multicast content, from the unicast addresses, and the requested methods of delivery for the multicast content. The at least one virtual multicast request includes a unicast address identifying a client computer of the network and a requested method of delivery for the multicast content.

BRIEF DESCRIPTION OF THE DRAWINGS

The detailed description will refer to the following drawings, in which like numbers refer to like items, and in which.

DETAILED DESCRIPTION OF PREFERRED EMBODIMENTS

Figure 1:
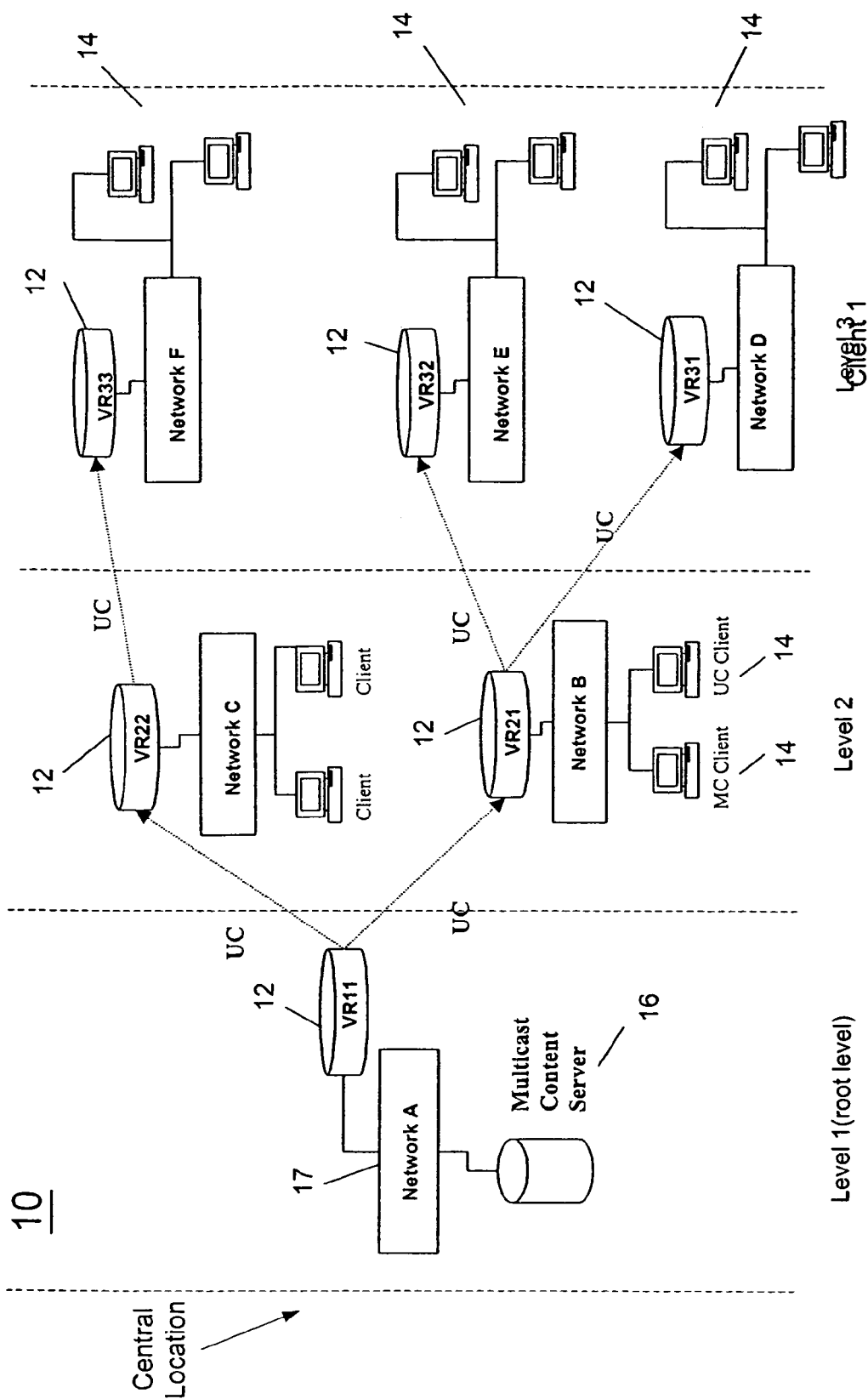
FIG. 1 is a schematic diagram of an exemplary embodiment of a virtual multicasting system.

FIG. 1 is a schematic diagram of an exemplary application of a Virtual Multicasting (VMC) system according to the present invention. The embodiment shown in FIG. 1 is a virtual network 10 including a plurality of sub-networks (networks A-F). The virtual network 10 in FIG. 1 provides a fan-out distribution of packets. The VMC system includes software routing applications as well as computer hardware for hosting these applications. The components of the VMC system are listed as follows:

VMC System Hardware Components

Virtual Routers (VRs) 12, which preferably are standard computers with networking capabilities. Except for client components, the VMC software resides on the VRs.

Clients 14, which preferably are standard computers for end-users that comprise client software, including certain VMC software components, and receive content delivered by the VMC system over the virtual network 10. Clients 14 are the end-recipients of content distribution. Clients 14 preferably also include a network interface card/adapter and necessary networking software such as TCP/IP.

Content servers 16, which preferably are standard computers with networking, data-storage, and web hosting capabilities. Content preferably originates from the content servers 16. Content servers 16 may also serve as a web site, accessible via the Internet, hosting information about content availability.

VMC System Software Components

A Virtual Multicast Distribution protocol (VMCDP) that dictates how VRs 12 convert packets from multicast packets to unicast packets and vise versa, replicate packets for unicast clients 14 or downstream VRs 12 (VRs 12 located at virtual sub-networks downstream—e.g., VR22 is downstream from VR11), and deliver packets. The software conversion of packets from multicast to unicast may be accomplished by modifying destination IP of the packet at the IP layer. A standard multicast group is defined by an multicast IP address and a port. A unique value in the VMC system is how a channel is defined. A VMC channel map (see VMC file below) is created at the central location VR 12 (e.g., VR11) and fetched by all the downstream VRs 12. In the VMC system, a channel (or a multicast group in standard multicast) is defined by a port. When a VR 12 receives a unicast stream (designated to the VR 12) at a port on the map, the VR 12 automatically knows what multicast group the unicast stream belongs to based on the VMC channel map. This is impossible for standard Transmission Control Protocol/Internet Protocol (TCP/IP) without adding more information (like the multicast IP address) to the packet. Another unique feature is that VMC system does not alter the original packet. The VMC system does not add information to the original packet. The VMC system always keeps the original sender's IP address for possible backlink service. The VMC protocols describe below are only used on VRs 12 for registration and distribution mechanisms.

A Virtual Multicast Registration protocol (VMCRP). The VMCRP is used by VRs 12 for dynamic registration of client 14 requests for VMC content, periodic probing and the addition/removal of clients 14 or downstream VRs 12 from VMC client table files (see below). VMCRP is a protocol used among VRs 12 to forward requests of VMC content on certain channels. Upon receiving a request from a client 14 or another VR 12 (forwarding requests), a VR 12 will send a short message to all the VRs 12 at its parent level on the Virtual Network Tree (see VNT file below) asking for the parent VR's 12 loads and distance (judging by round trip time (RTT) of an ICMP packet). After making an optimal selection of a parent VR 12 based these two factors, the VR 12 will add the parent VR 12 entry to its client table (for unicast request—see VCT file below) or the multicast flag will be turned on (for a multicast request) and forward the request to the selected parent VR 12. VRs 12 will periodically send a probing (in dynamic registration) message to all it clients 14. A client 14 which fails to answer the probing will be removed from the client table. So no unnecessary streams (for clients 14 that fail to answer) will be send to that network. At the same time, clients 14 and VRs 12 may periodically send probing to their registered parent VRs 12. If a parent VR 12 fails to answer the probing, the client/VR will re-register all the content requests associated with the parent VR 12 with other parent VRs 12.

A Virtual IGMP protocol (VIGMP) for clients 14 to register requests for content with Virtual Routers 12. VIGMP reports generally indicate that the client 14 is requesting unicast delivery (the client 14 is not multicast enabled). Clients 14 in a multicast enabled portion of a network may transmit VIGMP reports requesting multicast delivery (the client 14 is multicast enabled). The VIGMP preferably is an application programming interface (API) for easy integration with client software.

VMC System Files

A Virtual Network Tree (VNT) File. The VNT file preferably contains a list of the VRs 12 on the entire virtual network 10. These VRs 12 are grouped by levels starting from root level VRs 12 at a central location (i.e., network A in FIG. 1). The VNT file describes the hierarchy of the virtual routers 12. For the example in FIG. 1, VR11 is at root level or level 1. VR21 and VR22 are at level 2 (i.e., level 2 VRs 12). VR31, VR32, and VR33 are at level 3 (i.e., level 3 VRs 12). The levels may represent regions, states, and cities, for example. The maximum number of VRs 12 at a certain level may be determined by the capacities of the VRs 12 at a higher level (i.e., closer to the root level).

The VNT file preferably also includes information about each VR 12 on the list. This information preferably includes an IP address of the VR 12 that is accessible by other VRs 12 and the full host name of the VR 12. The VNT file is preferably created at the central location and is preferably fetched by VRs 12 on the same virtual network 10 during the VR's 12 startup in order for the VRs 12 to determine their level (e.g., level 2) and to find the closest upstream VR 12.

A VMC Channel Map (VCM) File. The VCM file preferably includes a list of pairs of multicast IP addresses and port numbers supported by the specific VMC system. Each pair of addresses and port numbers defines a multicast channel for content distribution. The VCM file may be created at the central location and be fetched by VRs 12 on the same virtual network 10 during the VR's 12 startup in order for the VRs 12 to determine what multicast channels are available.

A VMC Client Table (VCT) File. Preferably, each VR 12 keeps a client table (the VCT file) for each available multicast channel (group). The VCT file contains a multicast flag and a list of unicast clients 14 for each supported multicast channel. The VCT file is created locally by the registration protocols VIGMP and VMCRP. The multicast flag for each supported multicast channel is turned on upon the VR 12 receiving of a VIGMP report for a multicast group (indicating that a client wants to receive the multicast content). The list of unicast clients 14 requesting content from each supported multicast channel is updated as follows: upon the VR 12 receiving a VIGMP/VMCRP unicast request from a client 14 or downstream VR 12 (the senders), the client's 14 or/and downstream VR's 12 IP address is added to the list of unicast clients in the VCT file, if the client 14 or VR 12 is not already on the list.

Function of the VMC System

The above VMC protocols (VMCDP, VMCRP and VIGMP) are built on top of standard TCP/IP protocols, such as UDP (user datagram protocol), IP (Internet Protocol), ICMP (Internet Control Message Protocol), and IGMP. Indeed, the messaging proscribed by the VMC protocols is identical to the underlying standard TCP/IP protocols. For example, the VIGMP reports are identical to IGMP reports.

Each VR 12 can receive/distribute multicast as well as unicast packets. The VRs 12 can also convert multicast packets to unicast packets, and vise-versa. Whether a VR 12 concerts multicast packets to unicast packet, or vice-versa, is determined by the VR 12 virtual multicast client table (VCT files) created by the registration protocol VMCRP requests. For example, if a client 14 sends a VIIGMP unicast request to the VR 12, the client's 14 IP address is added to the list of unicast clients in the VCT file and multicast packets for the requested multicast content group are converted to unicast packets for that client 14.

Referring to the exemplary application of the VMC system shown in FIG. 1, the virtual network 10 includes six sub-networks, networks A-F. Networks A-D are separate and connected only via the Internet, which is not (or at least not fully) multicast enabled. Network A is the central location where all the content packets (content for multicast distributing) originate in the virtual network 10. As shown, network A receives the content from the content server 16, which may be co-located with or remotely located from network A.

In the example illustrated in FIG. 1, virtual multicasting is achieved by running a virtual router 12 on each network A-F (in a similar way normal networks are configured with different routers) that requires virtual multicasting. The VNT file, which includes a virtual multicasting tree that describes the virtual network 10 and the sub-networks A-F, is built at the network A, the central location (the root of the tree). During the startup of each VR 12, each VR 12 communicates with VR11, the VR 12 at the central location, and fetches the VNT file and the VCM file. Each VR 12 uses the VNT file to determine their tree level and the closest upstream VR 12.

The VMC client 14 registration process is driven by client 14 requests for multicast content. Once a VR 12 detects the absence of a multicast enabled router (the absence of IGMP queries), the VR 12 periodically issues VIGMP queries using a control channel to the attached network A-F. The VIGMP queries are identical to IGMP queries for multicast clients. A user on a client 14 may review available multicast content on the content server 16 using a web browser, or other means. A multicast-enabled client 14, for example Client 1 on Network D, may request to join a multicast group for multicast content by sending out IGMP reports to the VR 12. A unicast client 14 wanting to receive the multicast content may use VIGMP reports to request unicast delivery (Unicast UDP) of the multicast packets. On a multicast-enabled network, where a regular router is issuing IGMP queries, the VR 12 preferably only listens to and processes the VIGMP reports.

A VR 12, for example VR31, that receives the VIGMP report adds the requesting unicast client 14 to the VCT file of the VR 12 (i.e., the VMC client table) for the requested multicast content group and forwards/registers the requested multicast group with one of the upstream VRs 12 using the registration protocol VMCRP. The upstream VR 12, with which the requested multicast group is registered, is preferably selected based on an optimal balance of the loading on each upstream VR 12 and the Round Trip Time (RTT) necessary for the registration to reach each upstream VR 12. The selected VR 12 (parent VR) forwards the registration to a further upstream VR 12 in a similar manner. This registration process preferably continues until the registration reaches the root VR 12 at the center location (network A).

The multicast content server 16 (which may be on the same network as the center location or remotely located from the center location) does not necessarily need to be multicasting since the root virtual router 12 can receive both multicast and unicast packets and convert them if necessary. With the distribution protocol VMCDP, once a VR 12 receives a multicast or unicast packet, the VR 12 checks against its VCT file (the VMC client table), conducts the necessary packet conversion and/or replication, and delivers a multicast packet to the attached network or/and multiple unicast packets to clients 14 on the attached network or/and downstream VRs 12.

A VR 12 preferably can send out a multicast packet and/or multiple unicast packets to clients 14 on the same network and/or to downstream VRs 12. For example, referring to the virtual network 10 in FIG. 1, VR21 may send a multicast packet to Network B if requested (by a multicast client, e.g. MC Client on Network B). In addition, VR21 replicates the packet and unicast the replicated packets to the unicast client (UC Client) on the attached network (Network B) and to downstream virtual routers VR31 and VR32.

The registration protocols VMCRP and VIGMP may be implemented dynamically. With the dynamic VMCRP and VIGMP, clients 14 and VRs 12 periodically re-register requests, check VCT files (the VMC client tables), and probe registered parent VRs 12. The probe may be to check if the registered parent VR 12 is still up. The registered parent VR 12 could be accidentally down or shut down for maintenance. The VR 12 or client 14 have the ability to switch to other parent VRs 12 for those channels already associated with the down parent VR 12. A client 14 in the VMC client table of a VR 12 is preferably removed from the VMC client table if the client 14 has not re-registered within a certain period of time. If the probe to a registered parent VR 12 fails, the current VR 12 re-registers with other upstream VR(s) 12 all the multicast content requests associated with the failed parent VR 12.

Exemplary VMC System Hardware Components

Figure 2A:
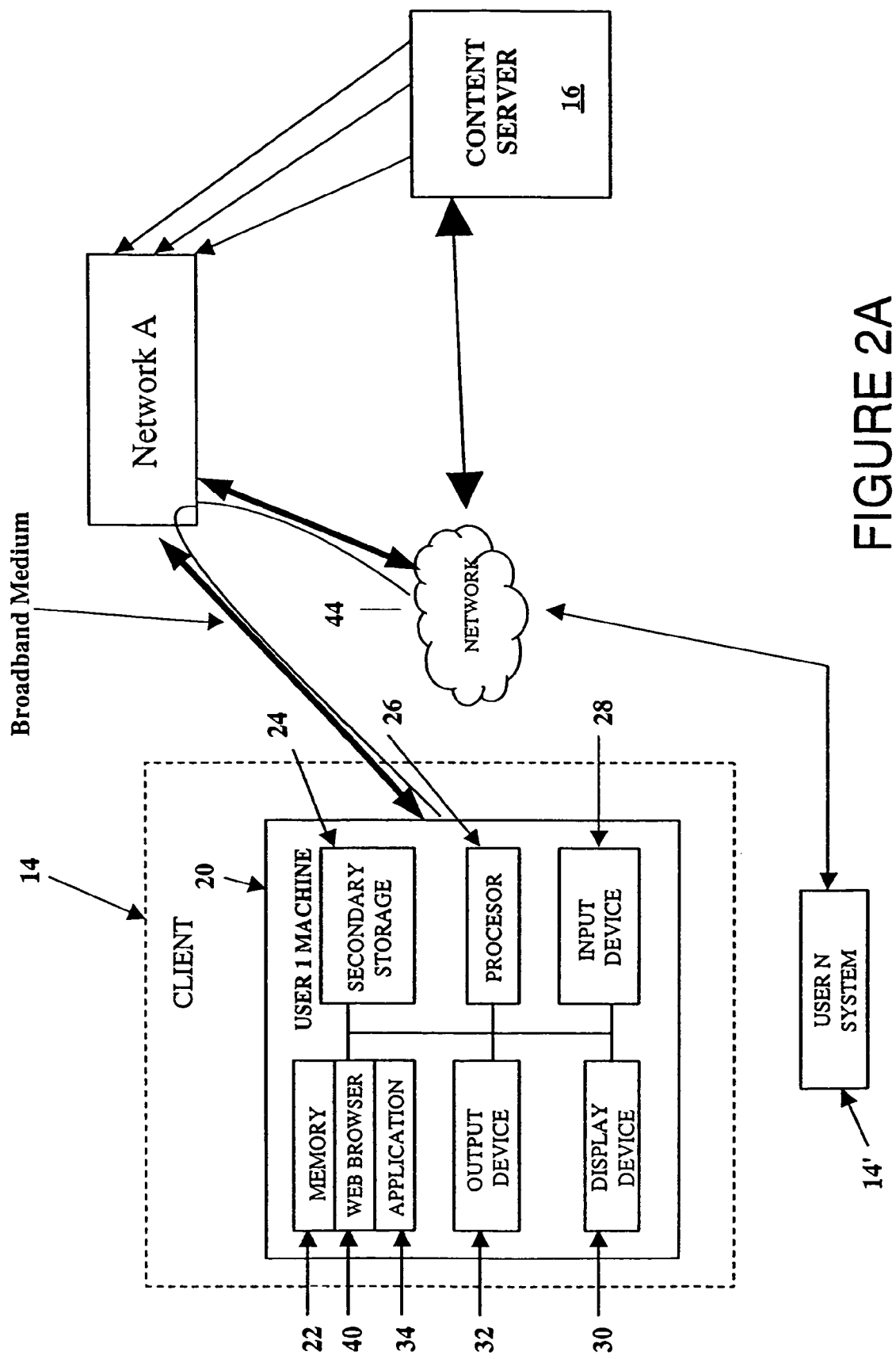
FIGS. 2a-2c are block diagrams illustrating exemplary hardware components of an embodiment of the virtual multicasting system.
Figure 2B:
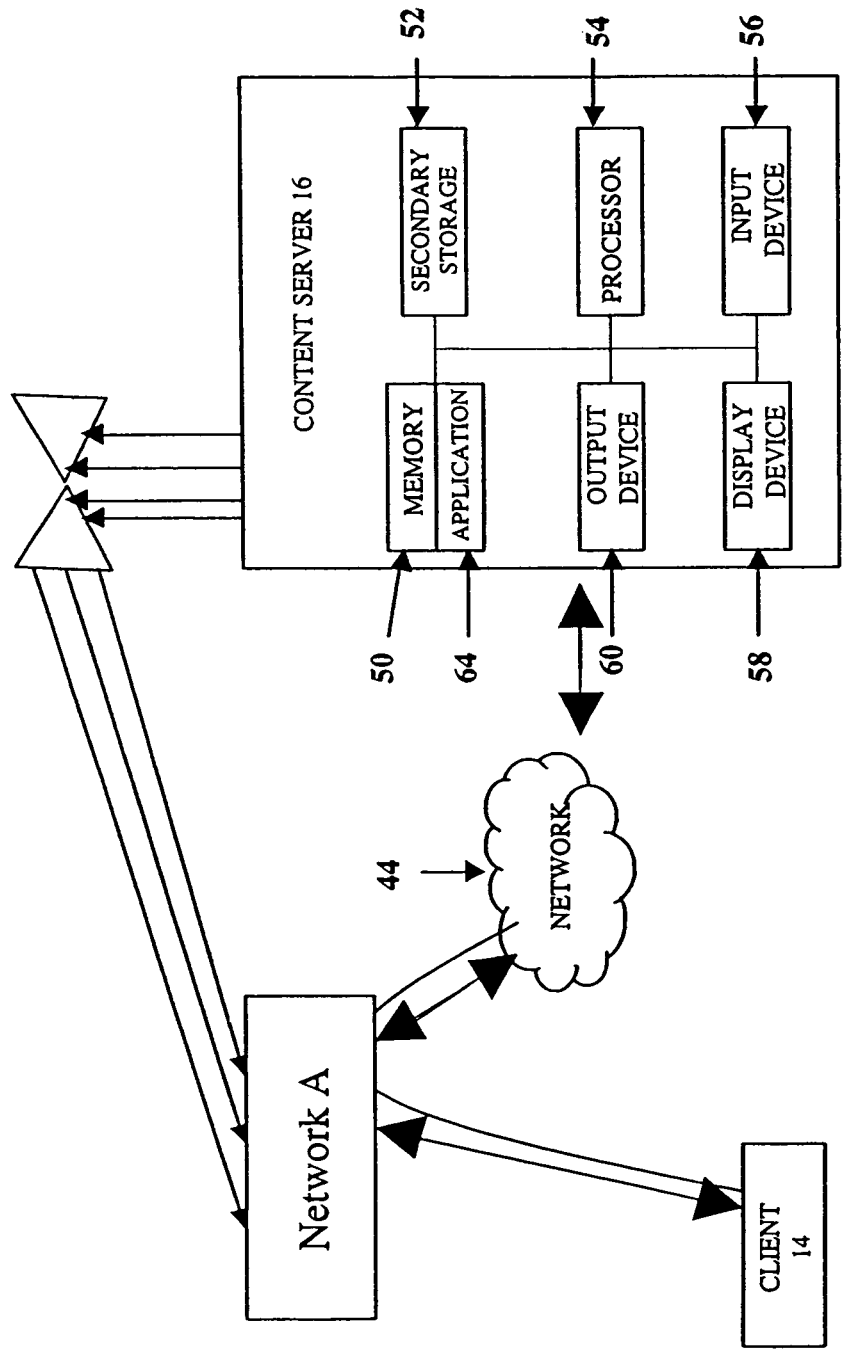
Figure 2C:
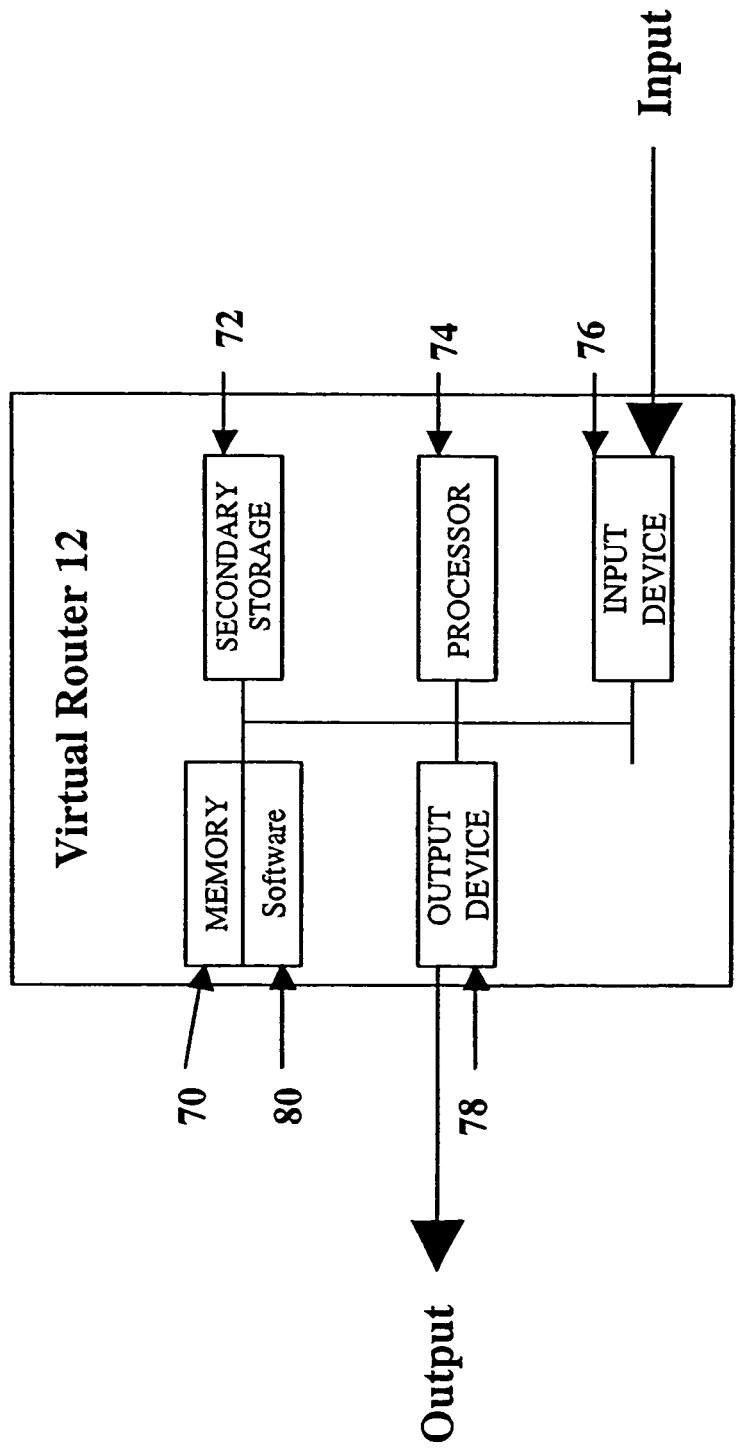

FIGS. 2*a* through 2*c* are block diagrams illustrating exemplary hardware components for implementing virtual multicasting and supporting a multicasting system.

Client 14

FIG. 2*a* illustrates an exemplary client 14. As shown, the client 14 preferably comprises a consumer PC/user machine 20 connected with a network 44 such as the Internet, a LAN or other network. Other clients, such as client 14' may also be connected with network 44 and may include the same components as user machine 20.

User machine 20 illustrates typical components of a user machine. User machine 20 typically includes a memory 22, a secondary storage device 24, a processor 26, an input device 28, a display device 30, and an output device 32. Memory 22 may include random access memory (RAM) or similar types of memory, and it may store one or more applications 34, including client software 36 and VIGMP API 38, and a web browser 40, for execution by processor 26. Secondary storage device 24 may include a hard disk drive, floppy disk drive, CD-ROM drive, or other types of non-volatile data storage. Processor 26 may execute applications or programs stored in memory 22 or secondary storage 24, or received from the Internet or other network 44. The processor 26 may execute one or more applications 34, including client software 36 and VIGMP API 38, in order to provide the functions described in this specification. Input device 28 may include any device for entering information into user machine 20, such as a keyboard, mouse, cursor-control device, touch-screen, infrared, microphone, digital camera, video recorder or camcorder. Display device 30 may include any type of device for presenting visual information such as, for example, a computer monitor or flat-screen display. Output device 32 may include any type of device for presenting a hard copy of information, such as a printer, and other types of output devices include speakers or any device for providing information in audio form.

Web browser 40 is used to access the VMC system and to choose which broadband content the user wishes to view. The web browser 40 also is used to access the Internet 44, content servers 16 (e.g., a NOC) and ISPs. Examples of web browsers 40 include the Netscape Navigator™ program and the Microsoft Internet Explorer™ program. Any web browser, co-browser, or other application capable of retrieving content from a network (any wireline or wireless network may be used) and displaying pages or screens may be used. Content broadcast (multicast or unicast) and received by the client 14 may be displayed through the web-browser 40. The content may include "links", for example, HyperText Transport Protocol ("HTTP") hyperlinks to other content and/or Internet websites. Multimedia applications such as Microsoft Media Player™ and RealPlayer™ may be used to enable viewing of real-time multicast or unicast streams.

Examples of user machines for interacting within the system include personal computers, laptop computers, notebook computers, palm top computers, network computers, Internet appliances, set top terminals or any processor-controlled device capable of executing a web browser 40 or other type of application for interacting with the VMC system.

Content Server

FIG. 2b illustrates typical hardware components of a content server 16. Content server 16 typically includes a memory 50, a secondary storage device 52, a processor 54, an input device 56, a display device 58, and an output device 60. Memory 50 may include RAM or similar types of memory, and it may store one or more applications 64 for execution by processor 54. Secondary storage device 52 may include a hard disk drive, floppy disk drive, CD-ROM drive, or other types of non-volatile data storage. Processor 54 executes application(s), which are stored in memory 50 or secondary storage 52, or received from the broadband connection, the Internet or other network 44. Input device 56 may include any device for entering information into content server 16, such as a keyboard, mouse, cursor-control device, touch-screen, infrared, microphone, digital camera, video recorder or camcorder. Display device 58 may include any type of device for presenting visual information such as, for example, a computer monitor or flat-screen display. Output device 60 may include any type of device for presenting a hard copy of information, such as a printer, and other types of output devices include speakers or any device for providing information in audio form.

Content server 16 may store one or more database structures in secondary storage 52, for example, for storing and maintaining information regarding the clients 14. For example, it may maintain a relational, object-oriented or other client database for storing information concerning system users, the access rights of the users and their account status. The database structures may also include content databases. For example, the content server 16 may maintain a relational, object-oriented or other content database for storing content and/or information concerning the content.

Processing by the processors 54 may provide and support pages, windows and menus described in this specification and otherwise for display on display devices associated with the client 14. The pages, windows and menus may be formatted, for example, as web pages in HyperText Markup Language (HTML), Extensible Markup Language (XML) or in any other suitable form for presentation on a display device depending upon applications used by users of the clients 14.

Although only one content server 16 is shown, multiple servers may be used as necessary or desired to support and provide the content and may also use back-up or redundant servers to prevent network downtime in the event of a failure of a particular server.

Virtual Router

FIG. 2c illustrates typical hardware components of a virtual router 12. A virtual router 12 is preferably a standard computer/server with networking functionality. Typically, the VR 12 includes a memory 70, a secondary storage device 72, a processor 74, a network input device 76, and a network output device 78. The memory 70, secondary storage device 72, and processor 74, are similar, in form and function to those of the content server 16 described above with reference to FIG. 2b. For example, the processor 74 may execute applications 80 stored in the memory 70 and/or secondary storage device 72, including VMCDP, VMCRP and VIMGP software described above, to perform the functions of the VMC system described herein. Likewise, the processor 74 may create and store files, including the VNT, VCM and VCT files described above, in the memory 70 and/or secondary storage device 72.

The network input device 76 and the network output device 78 may comprise network adaptors and/or network information cards (NIC). The network input device 76 and the network output device 78 are able input/output IP packets from/to the connected network (e.g., network A-F). The operating system on the VR 12 and the drivers on the network input device 76 and the network output device 78 support the standard TCP/IP protocols and can issue IP level protocols such as ICMP and IGMP. It is preferable for the operating system to support web-hosting protocols such as HTML, so the VR 12 may be configured and operated from remote sites.

In addition, although VR 12, client 14, and content server 16 are depicted with various components, one skilled in the art will appreciate that VR 12, client 14, and content server 16 can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as VR 12, client 14, and content server 16, to perform a particular method.

An Exemplary VMC Method

Figure 3A:
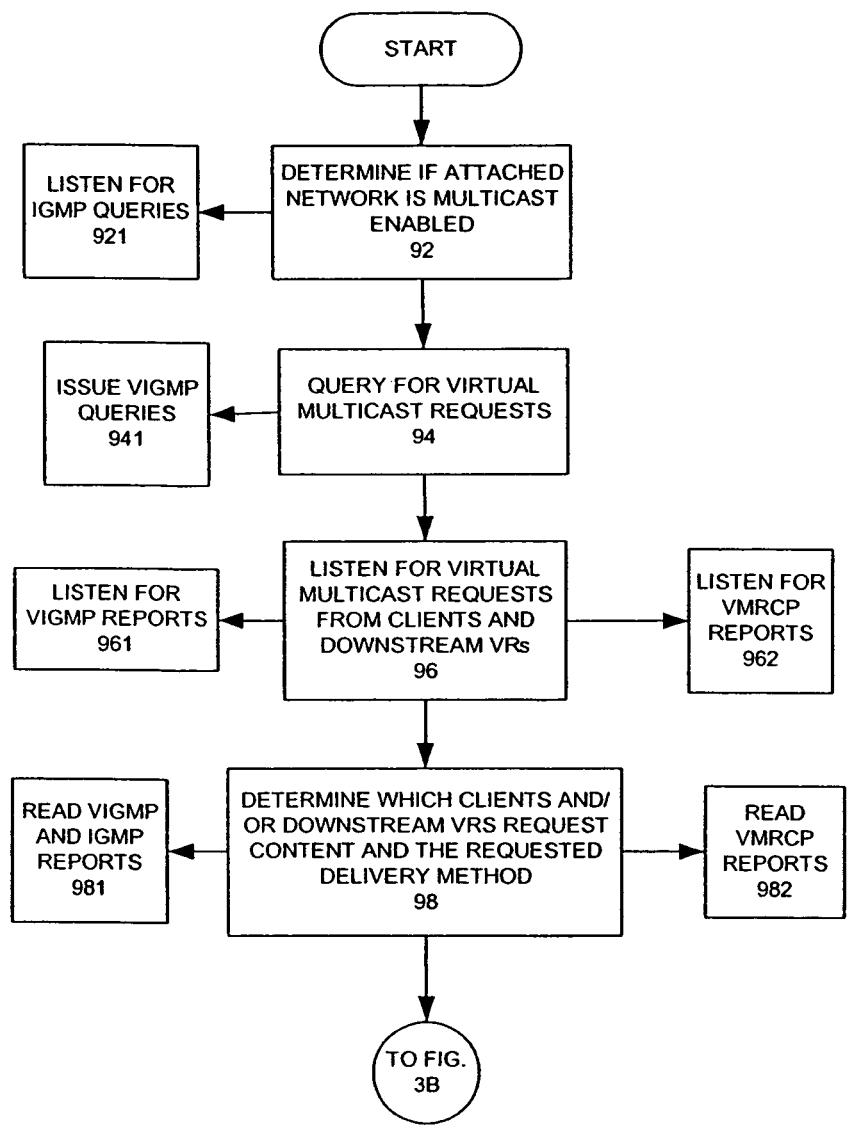
FIGS. 3a-3b are flowcharts illustrating an exemplary method of virtual multicasting.
Figure 3B:
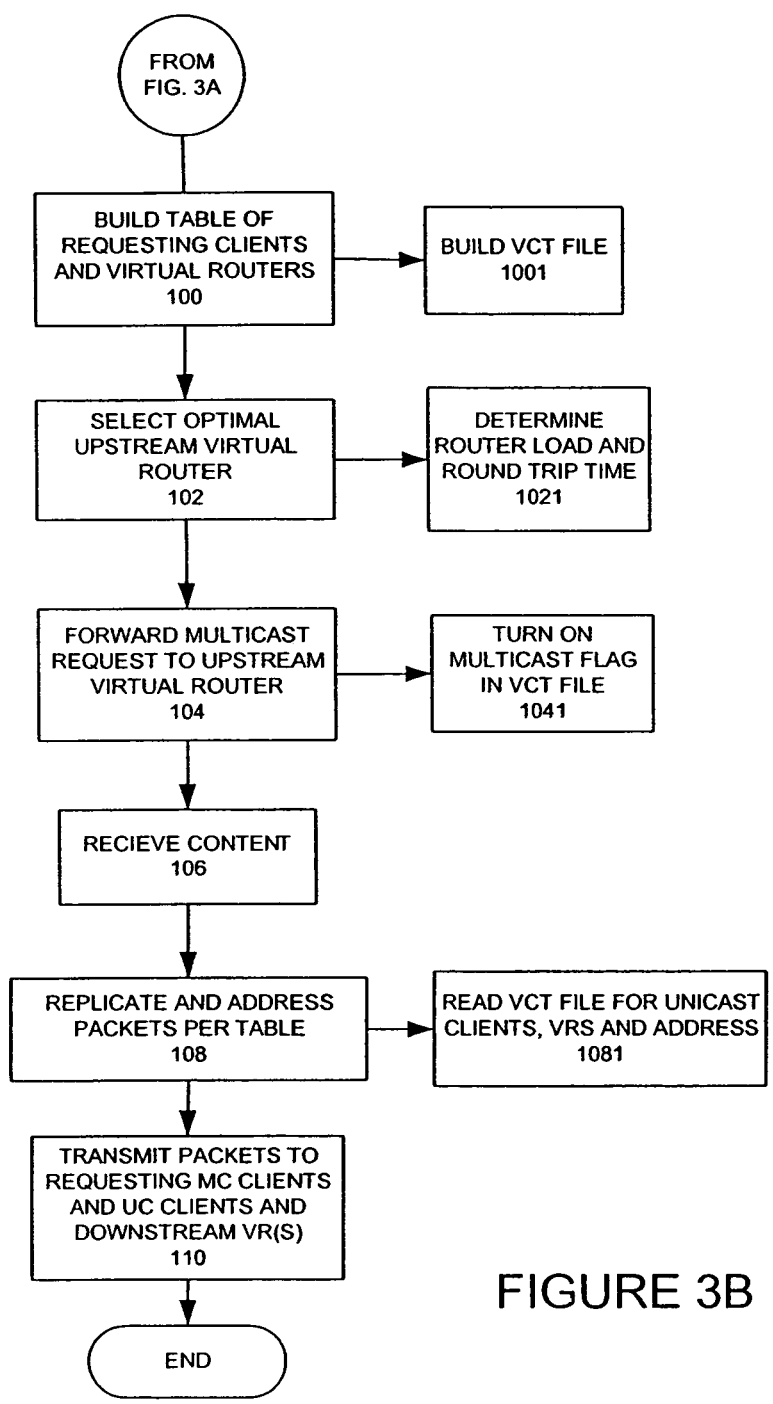

FIGS. 3a-3b illustrate an exemplary method 90 of virtual multicasting. Method 90 may be implemented, for example, with software modules for execution by processor 74, processor 26, or a combination of the two processors. In this implementation, multicast content (e.g., broadband content) is broadcast to a network(s) and offered to multiple network users (e.g., clients, other virtual routers, etc.). As shown, the method preferably comprises the steps of: determining if an attached network (e.g., network A-D) is multicast enabled 92; querying for virtual multicast requests 94; listening for virtual multicast requests from clients and downstream virtual routers 96; determining which clients and/or downstream virtual routers request multicast content and the requested delivery method 98; building a table of requesting clients and virtual routers 100; selecting an optimal upstream router 102 (only applicable for downstream VRs 12); forwarding multicast request to upstream virtual router 104 (only applicable for downstream VRs 12); receiving the requested multicast content 106; replicating and addressing packets per table 108; and transmitting packets to requesting multicast clients and unicast clients and downstream virtual routers 110.

A VR 12 is preferably associated with a network (e.g., network B) and preferably determines whether the attached network is multicast enabled, step 92, by listening for IGMP queries 921 (e.g., on the network control channel). If no IGMP queries are received within a certain period of time, the VR 12 determines that the attached network is not multicast enabled. If the network is not totally multicast enabled (e.g., a UNICAST UDP network) the VR 12 preferably queries for virtual multicast content requests (step 94) by issuing VIGMP queries 941 and listens for virtual multicast content requests from clients 14 and downstream VRs 12 (step 96) by listening for VIGMP reports 961 and listening for VMRCP reports 962. The VR 12 (e.g., VR 22 in FIG. 1) preferably determines (step 98) which clients 14 and/or downstream VRs 12 (e.g., VR 33) request the multicast content and the requested delivery method for the multicast content (e.g., multicast or unicast) for each request by reading VIGMP and IGMP reports 981 from clients 14 and reading VMCRP reports 982 from downstream VRs 12. The VIGMP reports indicate whether the requesting clients 14 are to get unicast or multicast delivery (clients 14 that will join the multicast group). The IGMP reports indicate that the requesting clients 14 are to get multicast delivery.

The virtual router preferably builds a table of requesting clients and virtual routers (step 100) by building a VCT file 1001 that comprises unicast addresses of the clients 14 and/or downstream VRs 12 that requested the content and an associated multicast address(es) that identifies the requested content. As described above, if the VR 12 is a downstream VR 12 (e.g., VR22 in FIG. 1), the VR 12 preferably selects an optimal upstream virtual router 102 by determining the upstream VR 12 (e.g., VR11 in FIG. 1) loads and round trip times (RTTs) 921 and balancing these two factors to select an optimal upstream VR 12. This step 102 is only performed when there is a plurality of upstream VRs 12 to choose from. The VR 12 may perform step 102 at startup.

The VR 12 preferably forwards the multicast request to the selected upstream VR 12 (step 104) by turning on the multicast flag in the VCT file 1041 and transmitting the VCT file to the upstream VR 12. As noted above, the multicast request (e.g., the VCT file) is forwarded upstream until it reaches the root level or central location VR 12 (e.g., VR11).

If the central location VR 12, the selected VR 12, and any intervening VRs 12 have received the multicast request, the multicast content is transmitted to the current VR 12 (preferably as unicast packets). The current VR 12 preferably receives the content (step 106) as a stream of packets. The VR 12 replicates the packets for each requesting network client 14 and downstream VR 12 addresses the replicated packets with the unicast addresses of the requesting network clients 14 and downstream VRs 12 (step 108) as determined by reading the VCT file for unicast clients 14, VRs 12 and their addresses 1081. If the VR 12 receives the content as multicast packets, the VR 12 converts the multicast packets to unicast packets. For clients requesting multicast delivery, the VR 12 simply transmits the packets as multicast packets in the normal manner. The VR 12 transmits the unicast packets to each requesting unicast client 14 and downstream VR 12 (step 110). If the virtual router determines that the network is multicast enabled, the content is multicast to the requesting network multicast users in a normal way (see above).

As noted above, if the network is multicast enabled, the VR 12 will only listen to VIGMP reports. As noted before, for multicast clients 14, VIGMP reports may be identical to IGMP reports. If the network is not multicast enabled, the VR 12 will periodically send out VIGMP queries after it detects the absence of IGMP query message. Clients 14 can use VIGMP to request for multicast delivery or unicast delivery of the content.

Figure 4:
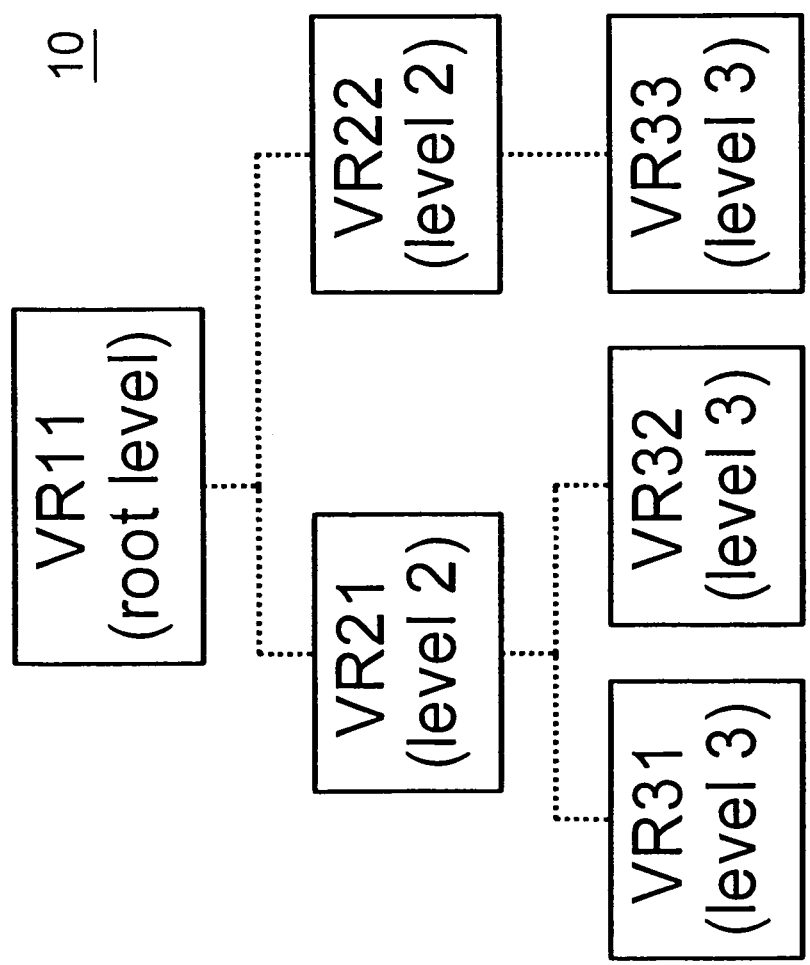
FIG. 4 is a schematic diagram of a virtual network tree.

As noted above, a VR 12 may replicate multicast content to other VRs 12, as well as clients 14. Virtual routers 12 may be logically stacked or hierarchically located on top of one another. FIG. 4 illustrates the hierarchical structure of VRs 12 of the example in FIG. 1. A VR 12, therefore, may maintain a VMC client table (a VCT file) that comprises unicast addresses for clients 14 and other VRs 12. A VR 12 may register with any VRs 12 above it (closer to the root) by using VMCRP or similar routing protocols. As noted, the decision of which parent VR 12 to register with is made based on an optimal balance of the load of parent VRs and the round trip time (RTT) to reach them. Accordingly, a central VR 12 may be co-located with a multicast content server in order to convert multicast streams to virtual multicast streams, with unicast addressing, that are broadcast to other VRs 12 at multiple networks. Likewise, one VR 12 may act as a backup for another VR 12 below it in the hierarchical structure.

Sample Implementation 1 of VMC System

Figure 5A:
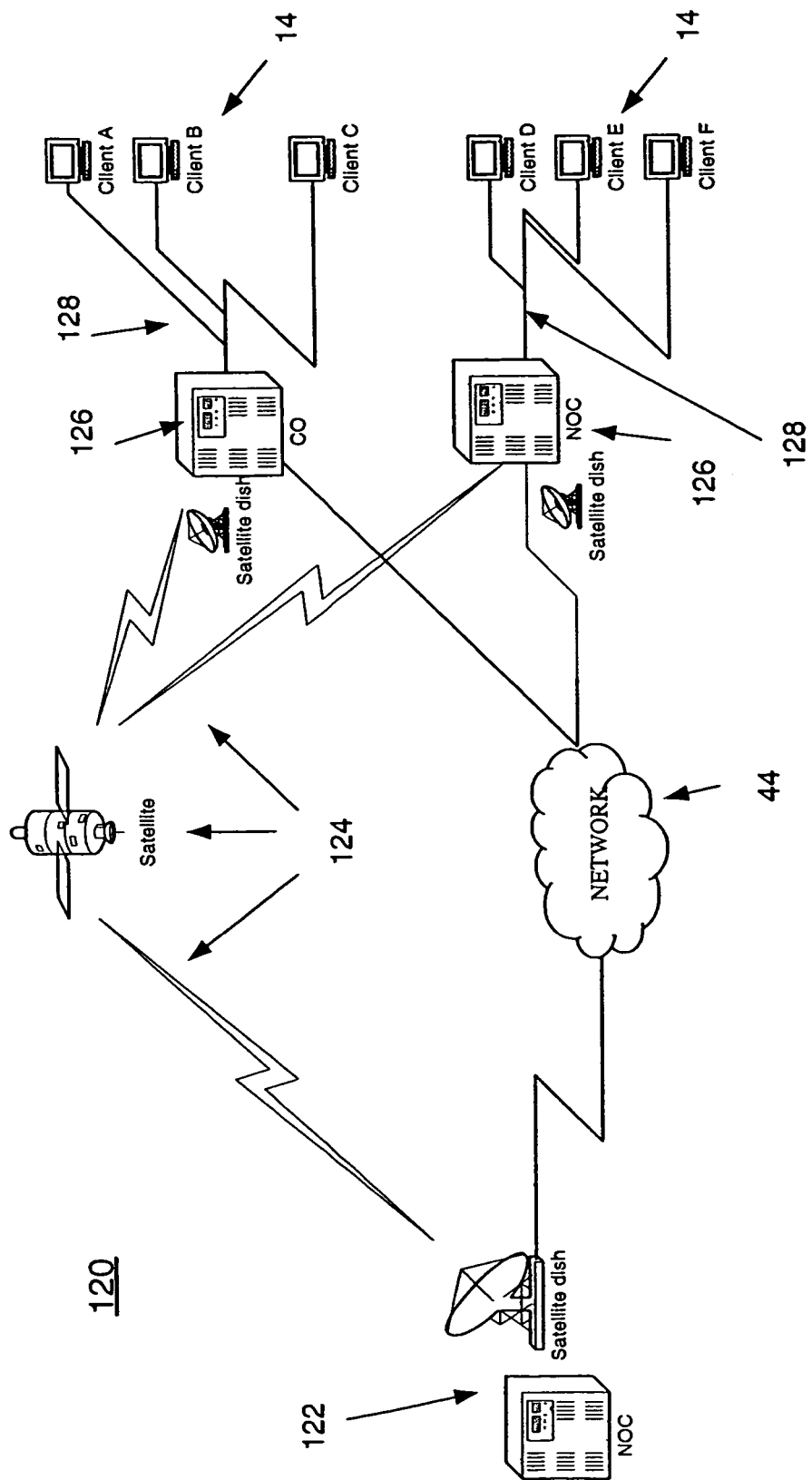
FIGS. 5a-5b are block diagrams illustrating an exemplary implementation of the virtual multicasting system.
Figure 5B:
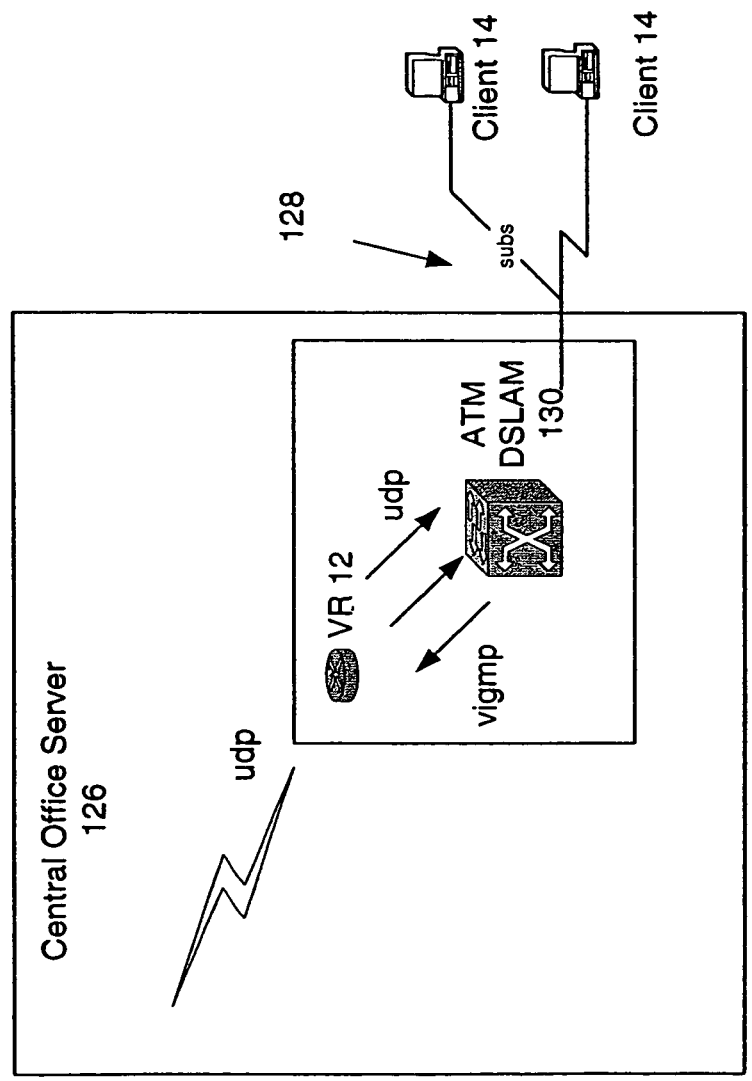

FIGS. 5a and 5b illustrate a sample implementation of the VMC system. The system 120 illustrated by FIG. 5 comprises one or more signal origination [or orientation] points 122 (e.g., network operation center or "NOC"), one or more transmission mediums 124 (e.g., transmitting satellite dish(es), satellite(s) and receiving satellite dish(es) and the Internet), and one or more central office ("CO") servers 126 (e.g., ISP servers) that support a network 128 of one or more clients 14. One example of the central office server 126 is depicted in FIG. 5b as comprising a VR 12 and an ATM/DSLAM switch 130, with connections via various sub-networks (e.g., broadband digital subscriber line (DSL) or cable) of the network 128 to one or more clients 14. The VR 12 may be resident or loaded on the actual router (not shown). In operation, the NOC 122, comprising the content server 16, broadcasts multicast content via the transmission medium 124 to the central office servers 126. The central office servers 126 distribute the content to the clients 14.

In addition to the multicast content, the NOC 122 may also provide information about content availability to its users through other channels, such as on a web site accessible via the Internet or other network 44. Clients 14 can access the web site to check which multicast content is available. If the network 128 is multicast enabled, a client 14 can request certain multicast content by registering with the ATM/DSLAM switch 130. The ATM/DSLAM switch 130 builds a table comprising the client's 14 address and the multicast address of the content and sends an IGMP packet to the router. In response to the IGMP packet, the router transmits the multicast stream for the requested content to the ATM/DSLAM switch 130 The ATM/DSLAM switch 130 replicates the multicast stream packets of the requested content and transmits them to the client 14, and any other requesting clients 14, based on its table.

If the network 128 is not multicast enabled (e.g., the ATM/DSLAM switch 130 does not have multicasting capability), a client 13 can transmit a VIGMP packet through the ATM/DSLAM switch 130 to the VR 12 requesting for unicast delivery. Preferably, the VIGMP packet registers the client 14 with the VR 12 and tells the VR 12 that the network 130 or sub-network on which the client 14 is located is not multicast enabled and that the client 14 wants to receive multicast content. The client 14 may contact the NOC 122 via the Internet or other network 44 to determine where the closest VR 12 is located before sending the VIGMP. The VR 12 may build a virtual VMC table or dynamic routing table (the VCT file) with information about the client 14 (e.g., the client's unicast address) so that it can replicate and transmit content packets to the client 14 when the client 14 requests content. As the VR 12 receives multicast content, the VR 12 may convert the requested multicast content by replicating the content packets and transmitting to the client 14 at the client's unicast address. Note, that the VR 12 may receive the multicast content as a unicast stream, for example, if there is another VR 12 upstream (e.g., co-located with the NOC 122) from the VR 12 (located at a central office 126). The packets of the unicast stream may include the multicast address of the content so that the VR 12 can identify and properly route the content.

Sample Implementation 2 of VMC System

Figure 6:
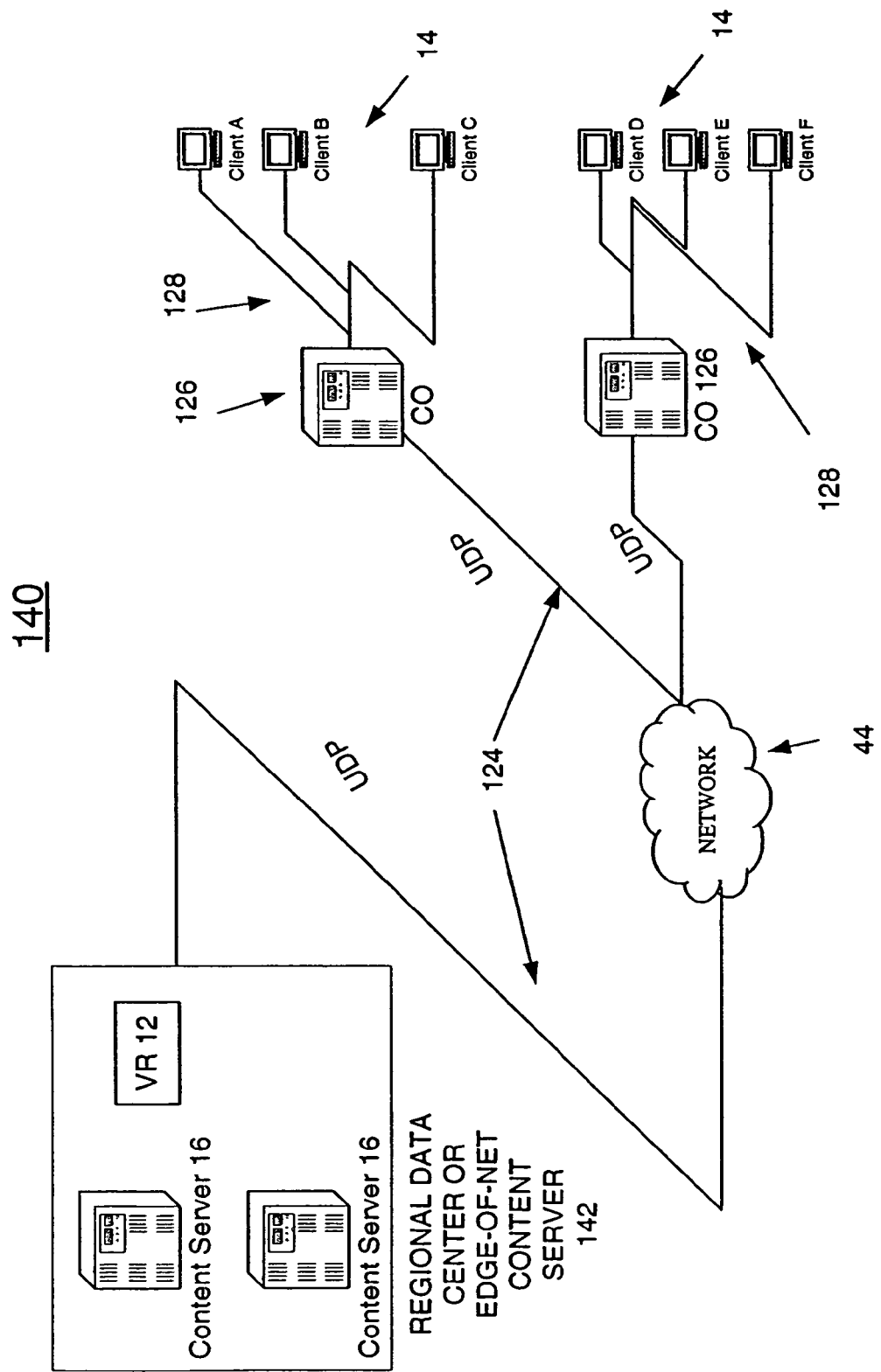
FIG. 6 is a block diagram of an exemplary implementation of the virtual multicasting system.

FIG. 6 illustrates another sample implementation of the virtual multicasting system. The system 140 illustrated by FIG. 6 comprises one or more regional data center or edge of net content servers 162, one or more central office servers 126 supporting networks 128 of clients 14, one or more transmission mediums 124 (e.g., landlines, DSL, cable, etc.) connecting the regional data center or edge of net content servers 162 to the central office servers 126, a plurality of clients 14 and broadband transmission mediums 128 connecting the central office servers 126 and the clients 14. The regional data center or edge of net content servers 162 may be co-located with a VR 12 so that the content broadcast by the content servers 16 may be virtually multicast. The VR 12 may convert multicast streams from the content servers 16 to unicast streams and broadcast them to central office servers 126 based on a central routing table comprising addresses for the central offices servers 126 with networks 128 of clients 14 that requested the content. For example, a movie that is requested by fifty thousand (50,000) clients 14 located on various central office networks 128 may be transmitted from a content server 16 to a VR 12 co-located with it at a regional data center 142, converted from a multicast stream to a unicast stream, replicated (as necessary) and broadcast across a landline(s) 124 to the various central office servers 126 and replicated and broadcast to the fifty thousand requesting clients 14 by VRs 12 at the central office servers 126. Since the content may be broadcast from the regional data center 142 as a unicast stream, the virtual multicasting provides a substantial bandwidth saving between the regional data center 142 and the central offices 126.

It is further noted that content that has been virtual multicast, as unicast, may be converted back to or re-broadcast as multicast. For example, in the system 140 shown in FIG. 6, if any of the central office servers 126 supported multicast enabled networks 128, the unicast stream received by the VR 12 at such central office servers 126 may be sent through to the ATM/DSLAM switch 130 and multicast to the clients 140, since the packets comprise the actual multicast address of the content. Likewise, if the network 128 receiving the virtual multicast stream is a LAN, the stream may be re-broadcast as a actual multicast stream since multicasting is supported within the LAN.

Figure 7:
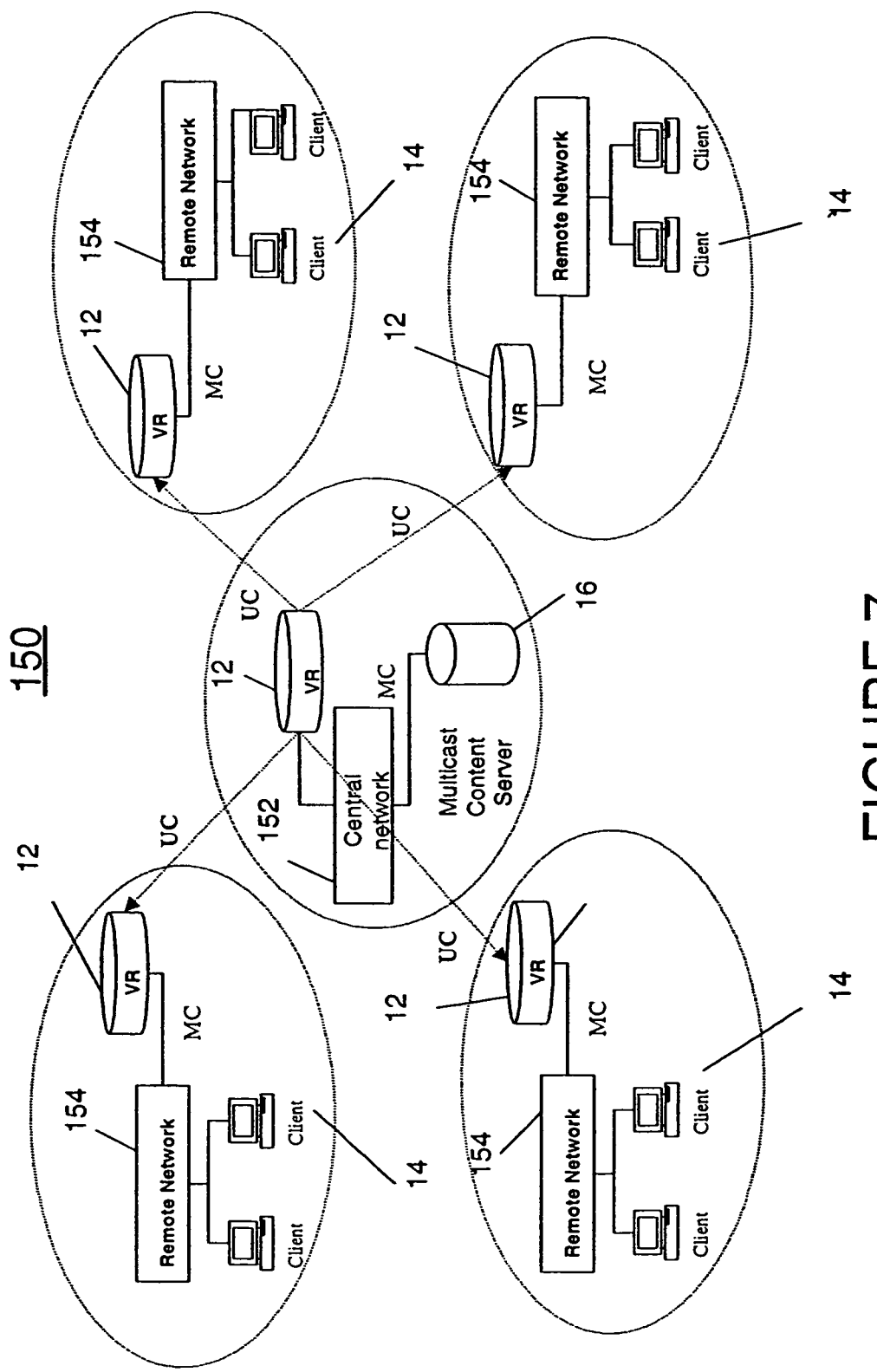
FIGS. 7 and 8 are schematic diagrams of exemplary embodiments of the virtual multicasting system.
Figure 8:
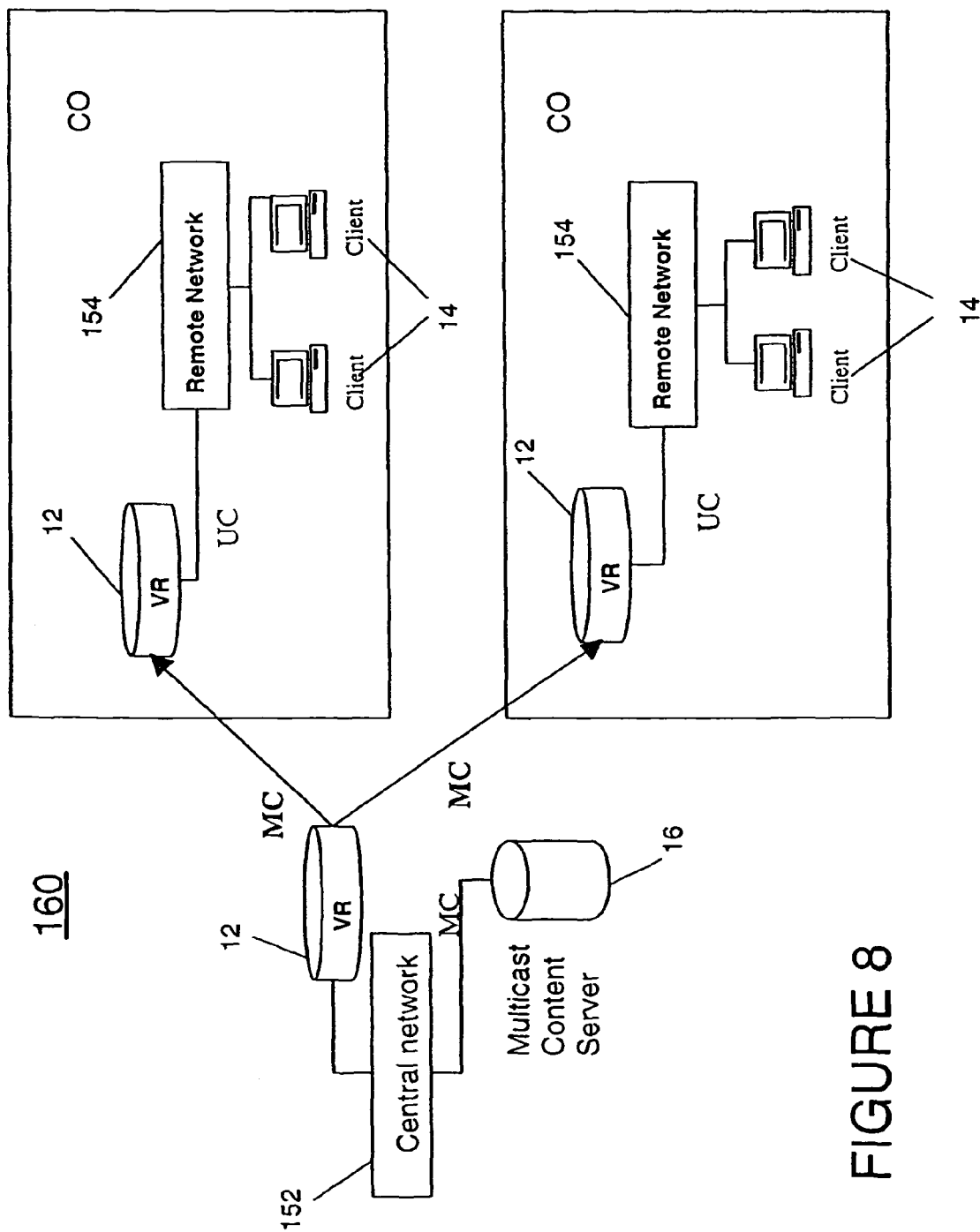

As noted above, the virtual network 10 in FIG. 1 is an application of the VMC system that may be used for fan-out distribution of packets. FIGS. 7 and 8 are schematic diagrams of additional exemplary applications of the VMC system according to the present invention. The exemplary virtual networks 150 and 160 shown in FIGS. 7 and 8 comprise VRs 12, clients 14, content servers 16, center networks 152 (corresponding to central location or root level network A in FIG. 1) and remote networks 154 (corresponding to networks B-F at levels 2 and below in FIG. 1). The virtual network 150 in FIG. 7 is a bridging-islands network. The virtual network 160 in FIG. 8 is a last-stop conversion network. The virtual networks 150 and 160 perform virtual multicasting as described above, with the center networks 152 fulfilling the role of the central location or center office server.

It is also noted that certain portions of networks may be multicast enabled while other portions are not. Consequently, a virtual router may conduct virtual multicasting simultaneously with a co-located router conducting true multicasting.

The terms and descriptions used herein are set forth by way of illustration only and are not meant as limitations. Those skilled in the art will recognize that numerous variations are possible within the spirit and scope of the invention.

What is claimed is:

1. A method of virtual multicasting (VMC) multicast content on non-multicast enabled networks, comprising the steps of:

determining if an attached network is multicast enabled, wherein the network includes client computers that have unicast addresses;

if the attached network is not multicast enabled, querying for virtual multicast requests for the multicast content from non-multicast enabled client computers;

listening for virtual multicast requests, wherein at least one virtual multicast request includes a unicast address identifying a client computer of the network and a requested method of delivery for the multicast content;

determining, based on the virtual multicast requests, which client computers request the multicast content, from the unicast addresses, and the requested methods of delivery for the multicast content; and transmitting the multicast content from a virtual router to client computers requesting the multicast content, wherein the transmitting includes the virtual router transmitting the multicast content as unicast content to non-multicast enabled client computers and as multicast content to multicast enabled client computers, wherein the virtual router maintains an original multicast content sender IP address in the unicast content.

2. The method of claim 1, further comprising the step of:
building a table of requesting client computers based on the requesting client computers determined from the determining step.

3. The method of claim 2, wherein transmitting the multicast content from a virtual router to client computers requesting the multicast content further comprises:
receiving the multicast content, wherein the multicast content comprises a plurality of packets;
replicating the packets and addressing the packets per the table of requesting client computers; and
transmitting the replicated and addressed packets to the requesting client computers.

4. The method of claim 3, wherein:
the building step builds a VMC client table (VCT) file that includes the identities of the requesting client computers and the unicast addresses of the requesting clients; and
the method further comprises:
reading the VCT file for the identities of the requesting client computers and the unicast addresses of the requesting clients, wherein the replicating step addresses the packets per the unicast addresses of the requesting clients.

5. The method of claim 1, further comprising the steps of:
selecting an optimal upstream virtual router; and
forwarding a multicast request for the multicast content to the selected upstream virtual router.

6. The method of claim 5, wherein the selecting step comprises the steps of:
determining a router load on upstream virtual routers;
determining a round trip time on the upstream virtual routers; and
balancing the determined router loads and round trip times for the upstream virtual routers, wherein the selecting step selects the upstream virtual router with the best balance of router load and round trip time.

7. The method of claim 1, wherein the determining if the attached network is multicast enabled comprises the step of:
listening for Internet Group Management Protocol (IGMP) queries.

8. The method of claim 1, wherein the querying step comprises the step of:
issuing virtual IGMP (VIGMP) queries, wherein VIGMP queries query client computers for VIGMP reports that request unicast or multicast delivery of the multicast content.

9. The method of claim 8, wherein the VIGMP reports that request unicast delivery of the multicast content include a unicast address for a requesting client computer and a multicast address for the multicast content.

10. The method of claim 1, wherein the listening step listens for virtual multicast requests from downstream virtual routers.

11. The method of claim 10, wherein the listening step listens for virtual multicast requests from downstream virtual routers by listening for Virtual Multicast Registration protocol (VMCRP) reports from the downstream virtual routers.

12. The method of claim 11, wherein the VMCRP reports include a unicast address for a requesting downstream virtual router and a multicast address for the multicast content.

13. A tangible, non-carrier wave computer-readable medium comprising instructions for virtual multicasting (VMC) multicast content on non-multicast enabled networks, by:
determining if an attached network is multicast enabled, wherein the network includes client computers that have unicast addresses;
if the attached network is not multicast enabled, querying for virtual multicast requests for the multicast content from non-multicast enabled client computers;
listening for virtual multicast requests, wherein at least one virtual multicast request includes a unicast address identifying a client computer of the network and a requested method of delivery for the multicast content;
determining, based on the virtual multicast requests, which client computers request the multicast content, from the unicast addresses, and the requested methods of delivery for the multicast content; and
transmitting the multicast content from a virtual router to client computers requesting the multicast content, wherein the transmitting includes the virtual router transmitting the multicast content as unicast content to non-multicast enabled client computers and as multicast content to multicast enabled client computers, wherein the virtual router maintains an original multicast content sender IP address in the unicast content.

14. The computer-readable medium of claim 13, further comprising instructions for:
building a table of requesting client computers based on the requesting client computers determined from the determining step.

15. The computer-readable medium of claim 14, further comprising instructions for:
receiving the multicast content, wherein the multicast content comprises a plurality of packets;
replicating the packets and addressing the packets per the table of requesting client computers; and
transmitting the replicated and addressed packets to the requesting client computers.

16. The computer-readable medium of claim 15, wherein:
the building instruction builds a VMC client table (VCT) file that includes the identities of the requesting client computers and the unicast addresses of the requesting clients; and
the computer-readable medium further comprises instructions for:
reading the VCT file for the identities of the requesting client computers and the unicast addresses of the requesting clients, wherein the replicating instruction addresses the packets per the unicast addresses of the requesting clients.

17. The computer-readable medium of claim 13, further comprising instructions for:
selecting an optimal upstream virtual router; and
forwarding a multicast request for the multicast content to the selected upstream virtual router.

18. The computer-readable medium of claim 17, wherein the selecting instruction comprises instructions for:
determining a router load on upstream virtual routers;
determining a round trip time on the upstream virtual routers; and
balancing the determined router loads and round trip times for the upstream virtual routers, wherein the selecting instruction selects the upstream virtual router with the best balance of router load and round trip time.

19. The computer-readable medium of claim 13, wherein the determining if the attached network is multicast enabled instruction comprises instructions for:
listening for Internet Group Management Protocol (IGMP) queries.

20. The computer-readable medium of claim 13, wherein the querying instruction comprises instructions for:

issuing virtual IGMP (VIGMP) queries, wherein VIGMP queries query client computers for VIGMP reports that request unicast or multicast delivery of the multicast content.

21. The computer-readable medium of claim 20, wherein the VIGMP reports that request unicast delivery of the multicast content include a unicast address for a requesting client computer and a multicast address for the multicast content.

22. The computer-readable medium of claim 13, wherein the listening instruction listens for virtual multicast requests from downstream virtual routers.

23. The computer-readable medium of claim 22, wherein the listening instruction listens for virtual multicast requests from downstream virtual routers by listening for Virtual Multicast Registration protocol (VMCRP) reports from the downstream virtual routers.

24. The computer-readable medium of claim 23, wherein the VMCRP reports include a unicast address for a requesting downstream virtual router and a multicast address for the multicast content.

25. A system for virtual multicasting (VMC) multicast content on non-multicast enabled networks, comprising:
a virtual router;
an attached network associated with the virtual router, wherein the attached network includes a plurality of client computers that have unicast addresses; and
wherein the virtual router includes software comprising instructions for:
determining if the attached network is multicast enabled;
if the attached network is not multicast enabled, querying for virtual multicast requests for the multicast content from non-multicast enabled client computers;
listening for virtual multicast requests, wherein at least one virtual multicast request includes a unicast address identifying a client computer of the network and a requested method of delivery for the multicast content; and
determining, based on the virtual multicast requests, which client computers request the multicast content, from the unicast addresses, and the requested methods of delivery for the multicast content; and
transmitting the multicast content from a virtual router to client computers requesting the multicast content, wherein the transmitting includes the virtual router transmitting the multicast content as unicast content to non-multicast enabled client computers and as multicast content to multicast enabled client computers, wherein the virtual router maintains an original multicast content sender IP address in the unicast content.

26. The system of claim 25, wherein the virtual router software further comprises instructions for:
building a table of requesting client computers based on the requesting client computers determined from the determining step.

27. The system of claim 26, wherein the virtual router software further comprises instructions for:
receiving the multicast content, wherein the multicast content comprises a plurality of packets;
replicating the packets and addressing the packets per the table of requesting client computers; and
transmitting the replicated and addressed packets to the requesting client computers.

28. The system of claim 27, wherein:
the building instruction builds a VMC client table (VCT) file that includes the identities of the requesting client computers and the unicast addresses of the requesting clients; and
the virtual router software further comprises instructions for:
reading the VCT file for the identities of the requesting client computers and the unicast addresses of the requesting clients, wherein the replicating instruction addresses the packets per the unicast addresses of the requesting clients.

29. The system of claim 25, further comprising a plurality of upstream virtual routers, wherein the virtual router software further comprises instructions for:
selecting an optimal upstream virtual router; and
forwarding a multicast request for the multicast content to the selected upstream virtual router.

30. The system of claim 29, wherein the selecting instruction comprises instructions for:
determining a router load on upstream virtual routers;
determining a round trip time on the upstream virtual routers; and
balancing the determined router loads and round trip times for the upstream virtual routers, wherein the selecting instruction selects the upstream virtual router with the best balance of router load and round trip time.

31. The system of claim 25, wherein the determining if the attached network is multicast enabled instruction comprises instructions for:
listening for Internet Group Management Protocol (IGMP) queries.

32. The system of claim 25, wherein the querying instruction comprises instructions for:
issuing virtual IGMP (VIGMP) queries, wherein VIGMP queries query client computers for VIGMP reports that request unicast or multicast delivery of the multicast content.

33. The system of claim 32, wherein the VIGMP reports that request unicast delivery of the multicast content include a unicast address for a requesting client computer and a multicast address for the multicast content.

34. The system of claim 25, wherein system further comprises one or more downstream virtual routers and the listening instruction listens for virtual multicast requests from downstream virtual routers.

35. The system of claim 34, wherein the listening instruction listens for virtual multicast requests from downstream virtual routers by listening for Virtual Multicast Registration protocol (VMCRP) reports from the downstream virtual routers.

36. The system of claim 35, wherein the VMCRP reports include a unicast address for a requesting downstream virtual router and a multicast address for the multicast content.

37. The method of claim 2 further comprising:
creating a virtual channel based on the table, wherein the virtual channel is configured so that the multicast content transmitted on the virtual channel is delivered as unicast content to the requesting client computers;
associating the virtual channel with a port of the virtual router;
receiving the multicast content at the associated port of the virtual router; and
in response to receiving the multicast content at the associated port, the virtual router automatically transmitting the multicast content on the virtual channel, wherein the multicast content is delivered as unicast content to the requesting client computers.

38. The computer readable medium of claim 14 further comprising instructions for:
- creating a virtual channel based on the table, wherein the virtual channel is configured so that the multicast content transmitted on the virtual channel is delivered as unicast content to the requesting client computers;
- associating the virtual channel with a port of the virtual router;
- receiving the multicast content at the associated port of the virtual router; and
- in response to receiving the multicast content at the associated port, the virtual router automatically transmitting the multicast content on the virtual channel, wherein the multicast content is delivered as unicast content to the requesting client computers.

39. The system of claim 25 wherein the software further comprising instructions for:
- creating a virtual channel based on the table, wherein the virtual channel is configured so that the multicast content transmitted on the virtual channel is delivered as unicast content to the requesting client computers;
- associating the virtual channel with a port of the virtual router;
- receiving the multicast content at the associated port of the virtual router; and
- in response to receiving the multicast content at the associated port, the virtual router automatically transmitting the multicast content on the virtual channel, wherein the multicast content is delivered as unicast content to the requesting client computers.

* * * * *